United States Patent [19]
Qian

[11] Patent Number: 5,758,645
[45] Date of Patent: Jun. 2, 1998

[54] AUTOMATIC DETECTION AND CORRECTION OF BODY ORGAN MOTION AND PARTICULARLY CARDIAC MOTION IN NUCLEAR MEDICINE STUDIES

[75] Inventor: Jianzhong Qian, Princeton Junction, N.J.

[73] Assignee: Siemens Medical Systems, Inc., Iselin, N.J.

[21] Appl. No.: 618,692

[22] Filed: Mar. 21, 1996

[51] Int. Cl.$^6$ .......................................... A61B 5/05
[52] U.S. Cl. ............... 128/653.1; 382/128; 250/363.02
[58] Field of Search ....................... 128/653.1, 654, 128/659; 250/363.02, 363.04, 309; 382/128

[56] References Cited

U.S. PATENT DOCUMENTS

| | | | |
|---|---|---|---|
| 3,780,290 | 12/1973 | Hoffer | 250/303 |
| 4,436,095 | 3/1984 | Kruger | 128/654 |
| 4,466,075 | 8/1984 | Groch et al. | 250/363.07 |
| 4,737,921 | 4/1988 | Goldwasser et al. | 395/121 |
| 5,311,427 | 5/1994 | Ichihara | 128/653.1 |
| 5,421,331 | 6/1995 | Devito et al. | 382/128 |
| 5,431,161 | 7/1995 | Ryals | 128/653.1 |
| 5,532,490 | 7/1996 | Gullberg et al. | 378/901 |
| 5,579,358 | 11/1996 | Lin | 250/363.02 |

FOREIGN PATENT DOCUMENTS

WO93/18470A 9/1993 WIPO.

OTHER PUBLICATIONS

Eisner et al., "Use of Cross-Correlation Function to Detect Patient Motion During SPECT Imaging", The Journal of Nuclear Medicine, vol. 28 (1987) Jan., No. 1, pp. 97-101.

Primary Examiner—Brian L. Casler
Attorney, Agent, or Firm—Mark H. Jay

[57] ABSTRACT

A SPECT study is carried out on a patient's body organ, such as the heart, and frames of image data are thereby acquired. The image data in these frames are subjected to a series of mappings and computations, from which frames containing a significant quantity of organ motion can be identified. Quantification of the motion occurs by shifting some of the mapped data within a predetermined range, and selecting that data shift which minimizes the magnitude of a motion-sensitive mathematical function.

7 Claims, 13 Drawing Sheets

FIG. 1

$$\begin{bmatrix} A_{11} & A_{12} & A_{13} & B_{11} & B_{12} & B_{13} \\ A_{21} & A_{22} & A_{23} & B_{21} & B_{22} & B_{23} \\ A_{31} & A_{32} & A_{33} & B_{31} & B_{32} & B_{33} \\ \\ C_{11} & C_{12} & C_{13} & D_{11} & D_{12} & D_{13} \\ C_{21} & C_{22} & C_{23} & D_{21} & D_{22} & D_{23} \\ C_{31} & C_{32} & C_{33} & D_{31} & D_{32} & D_{33} \end{bmatrix}$$

FIG. 2

$$\begin{bmatrix} CI_{11} & CI_{12} & CI_{13} & CI_{14} \\ CI_{21} & CI_{22} & CI_{23} & CI_{24} \\ CI_{31} & CI_{32} & CI_{33} & CI_{34} \end{bmatrix}$$

FIG. 3

$$\begin{bmatrix} RI_{11} & RI_{12} & RI_{13} \\ RI_{21} & RI_{22} & RI_{23} \\ RI_{31} & RI_{32} & RI_{33} \\ RI_{41} & RI_{42} & RI_{43} \end{bmatrix}$$

AUTOMATIC DETECTION AND CORRECTION OF BODY ORGAN MOTION AND PARTICULARLY CARDIAC MOTION IN NUCLEAR MEDICINE STUDIES

BACKGROUND OF THE INVENTION

The invention relates to nuclear medicine, and more particularly relates to motion detection for nuclear medicine studies. In its most immediate sense, the invention relates to correction for body motion and upward heart creep such as occurs during myocardial perfusion studies.

A myocardial perfusion study is carried out to determine whether the patient's myocardium (heart tissue) is dead or diseased. In such a study, two nuclear medicine images of the patient's heart are acquired and compared. One image is acquired after the patient has rested, and the other image is acquired after the patient has exercised. If a particular heart region is dark in both images, this means that no blood perfuses the myocardium in that region. It follows that the myocardium in that region is dead. However, if a particular heart region is bright in the post-resting image but relatively dark in the post-exercise image, this means that the myocardium in that region is diseased; it is capable of being perfused but incapable of staying perfused under conditions of stress.

The diagnostic usefulness of a myocardial perfusion study depends inter alia upon the comparability of the post-resting and post-exercise images. If for example the patient moves while the post-exercise image is being acquired, the post-exercise image may not match up to the post-rest image and the differences between the images may not represent the effect of stress on the distribution of blood perfusion within the heart. Furthermore, patient motion can create image artifacts that mimic perfusion abnormalities. Thus, body motion of the patient must be monitored during the study so that the effects of such body motion can be determined and the acquired image data accordingly corrected.

Body motion is not the only category of motion that can diminish the diagnostic utility of a myocardial perfusion study. Another such category of motion is so-called "upward creep" of the patient's heart.

Such upward creep affects the post-exercise part of a myocardial perfusion study. A post-exercise patient has been induced to reach peak effort (and peak cardiac rate) by e.g. walking on a treadmill. When the patient stops exercising, his respiration is rapid and shallow. As a result, his diaphragm gradually moves upward, forcing the apex of his heart to move upward as well. Such movement, like the patient's body movement, prevents the post-resting and post-exercise images from matching up and may cause the study to produce a false positive result.

Conventional motion detection and correction techniques can be classified in three general categories. In one such category, image data from body or heart motion (as evidenced e.g. by a cine display of planar image data) is visually monitored. This method is unsuitable for quantifying the motion and consequently cannot be computer-implemented. In another such category, a point source of e.g. Co-57 is fixed to the patient's body. This is inconvenient and cannot detect upward creep of the patient's heart within the body. In the third such category, the Eisner frame-to-frame cross-correlation function is used to mathematically identify motion between adjacent frames of image data. This method does not identify gradual motion or smooth motion, and is therefore unsuitable for identifying or quantifying upward creep of the heart.

It would be advantageous to provide a method for detecting overall movement of a patient's body organ with respect to the scintillation camera detector.

It would likewise be advantageous to provide such a method that would be computer-implementable.

One object of the invention is to provide a method for detecting overall movement of a patient's body organ.

Another object of the invention is to provide a method for detecting and correcting for overall movement of a patient's heart, whether caused by body movement or by upward creep of the patient's heart.

Another object is to provide a method of this type that is implementable on a computer.

Yet another object is, in general, to improve on methods of this general type.

In accordance with the invention, a SPECT (Single Photon Emission Computed Tomography) study is conducted of a patient's body organ, thereby acquiring frames of SPECT projection images. The image data in these frames are subjected to a series of mappings and computations, from which frames containing a significant quantity of organ motion can be identified. Quantification of the motion occurs by shifting some of the mapped data within a predetermined range, and selecting that data shift which minimizes the magnitude of a motion-sensitive mathematical function.

BRIEF DESCRIPTION OF THE DRAWINGS

The invention will be better understood with reference to the following illustrative and non-limiting drawings, in which.

DETAILED DESCRIPTION OF PREFERRED EMBODIMENTS

In the description below, it is assumed that all image processing steps (e.g. the mappings, the calculations, the identifications etc.) are carried out automatically, using a computer (not shown). Persons skilled in the art know how to program a computer to carry out these steps.

FIGS. 1–7 have been grossly oversimplified for clarity. A typical SPECT image contains 4096 pixels (i.e. is 64 pixels square) and there are typically 64 SPECT images in a 180° cardiac study. However, for clarity, the description below proceeds as if there were four SPECT images in the study and as if there were nine pixels in each image frame. It will be understood that the number of SPECT images, and the number of pixels in each image frame, are not part of the invention.

Figure 1:
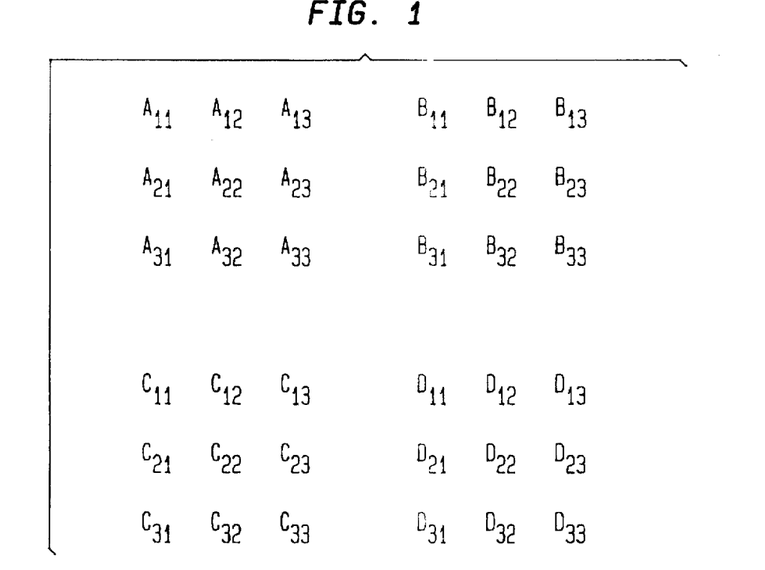
FIG. 1 schematically illustrates four SPECT projection images, each measuring 3 by 3 pixels.

In accordance with the preferred embodiment of the invention as applied to a cardiac study, a cardiac SPECT study is carried out. (Although the preferred embodiment is directed to cardiac studies, this is not required.) This produces a plurality of frames of planar SPECT projection image data, each image showing the heart as viewed from a particular detector station. FIG. 1 shows 4 such frames A, B, C and D, and each frame A, B, C and D is shown as being made up of nine pixels (e.g. A1,1, A1,2, A1,3, A2,2 ... A3,3).

Figure 2:
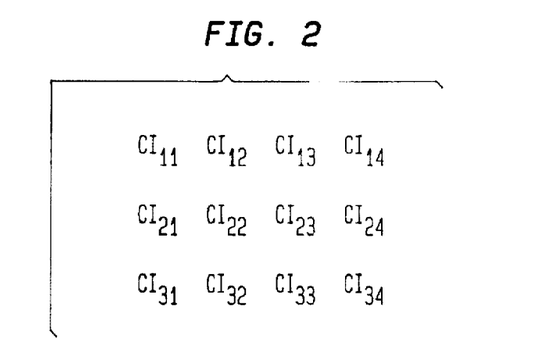
FIG. 2 schematically illustrates a column image formed from the SPECT projection images of FIG. 1.
Figure 3:
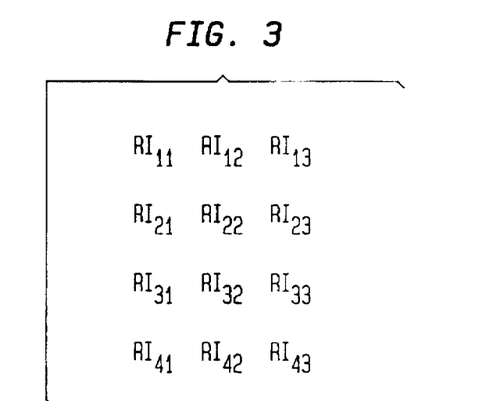
FIG. 3 schematically illustrates a row image formed from the SPECT projection images of FIG. 1.

After these SPECT projection image frames A, B, C, D have been acquired, each one is mapped to a column image (FIG. 2) and a row image (FIG. 3). This mapping process will be described with initial reference to the creation of the first column in the column image, on the assumption that the column is created from the top to the bottom.

Initially, the intensities of all the pixels in the top pixel row (A1,1, A1,2, A1,3) of the first SPECT projection image frame A are added together. The resulting sum is used as the value of the top pixel CI1,1 in the first column in the column image. Then, the intensities of all the pixels in the next pixel row (A2,1, A2,2, A2,3) of the first SPECT projection image frame A are added together. The resulting sum is the value of the next-to-top pixel CI2,1 in the first column of the column image. For each subsequent row of pixels in the first SPECT projection image frame A, the intensities of the pixels are summed and used as the value of the corresponding pixel in the first pixel column. At the end of this part of the mapping process, the first SPECT projection image frame A has been mapped to a single column CI1,1, CI2,1, CI3,1 with each pixel in that column having an intensity equalling the sum of the pixels in a corresponding row of the first SPECT projection image A.

The second SPECT projection image frame B is then mapped in the same way to form a second column in the column image. Likewise, the third and fourth SPECT projection image frames C and D are so mapped, thereby creating a column image in which the number of columns (four, in this instance) equals the number of SPECT projection image frames. Therefore, the four SPECT projection image frames will be mapped to a column image made up of four columns.

In an analogous manner, each of the SPECT projection image frames A, B, C, D is mapped to a row so as to form a row image (FIG. 3). Thus, the intensities of all the pixels in the left-hand column (A1,1, A2,1, A3,1) of the first SPECT projection image frame A are added and the sum is used as the value of the leftmost pixel RI1,1 in the first row of the row image. Next, the intensities of all the pixels in the next-to-left-hand column (A1,2, A2,2, A3,2) of the first SPECT projection image frame A are added together and the sum is used as the value of the next-to-leftmost pixel RI1,2 in the first row of the row image. This process is repeated until the first SPECT projection frame A has been mapped to the first row (R1,1, R1,2, R1,3) in the row image. In the same manner, each of the remaining SPECT projection image frames B, C, D is mapped to a corresponding row in the row image, thereby forming a row image made up of four rows. At the end of the mapping process, the four SPECT projection image frames A, B, C, D will be mapped to two images: a column image made up of four columns and a row image made up of four rows.

Although this mapping process has been described as being carried out in a particular sequence, this is not a part of the invention. The row and column images may be constructed simultaneously and the order in which the rows and columns are created is not a part of the invention. Any order of construction or calculation (including simultinaity) can be used.

Figure 4:
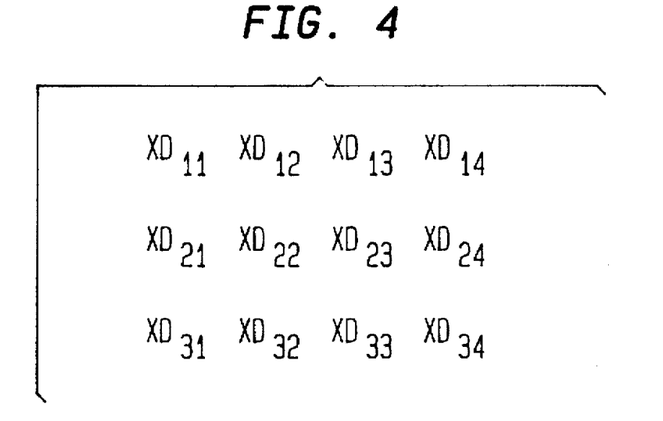
FIG. 4 schematically illustrates an X-direction second derivitive image formed from the column image of FIG. 2.
Figure 5:
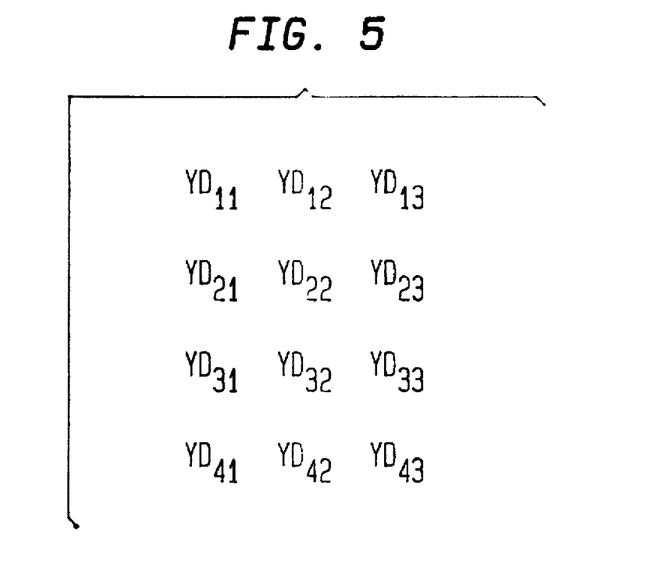
FIG. 5 schematically illustrates a Y-direction second derivitive image formed from the row image of FIG. 3.
Figure 6:
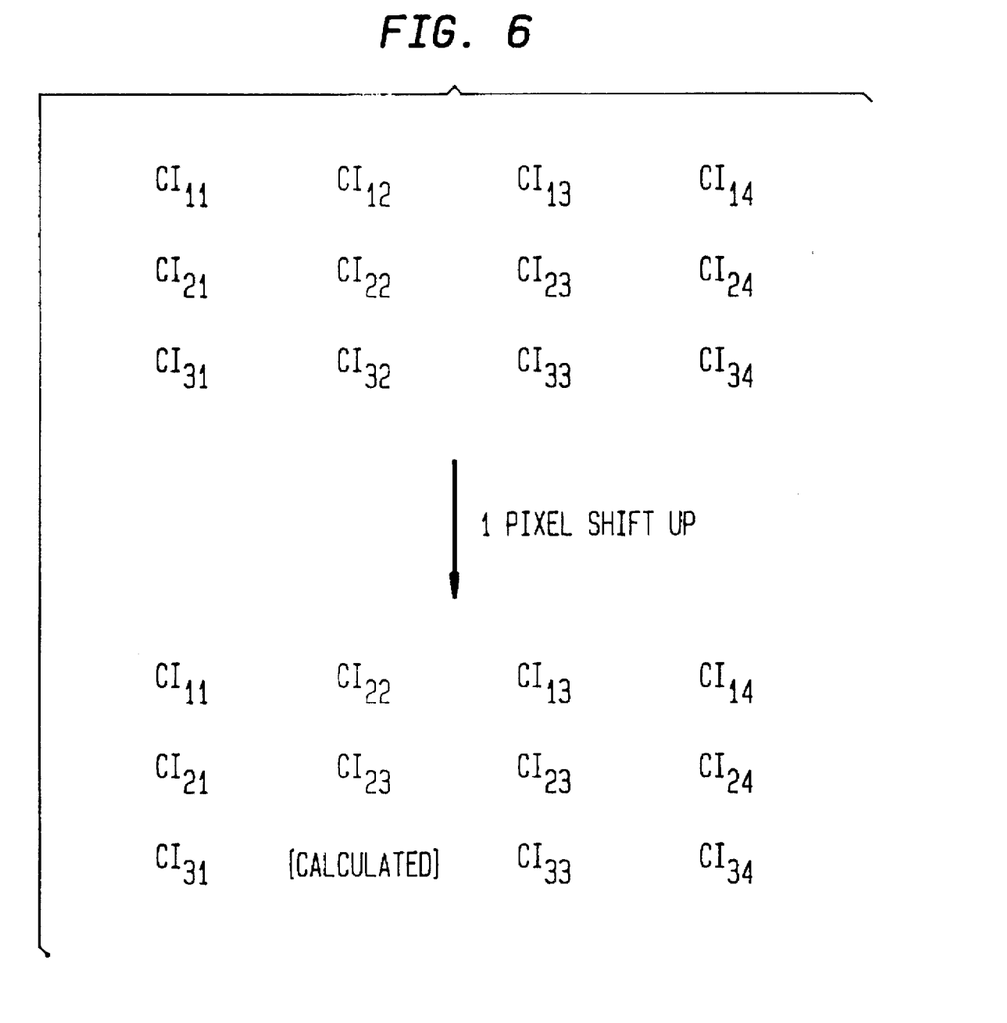
FIG. 6 schematically illustrates a data shift within an X-direction second derivitive image, which data shift corresponds to one pixel of motion to the right.
Figure 7:
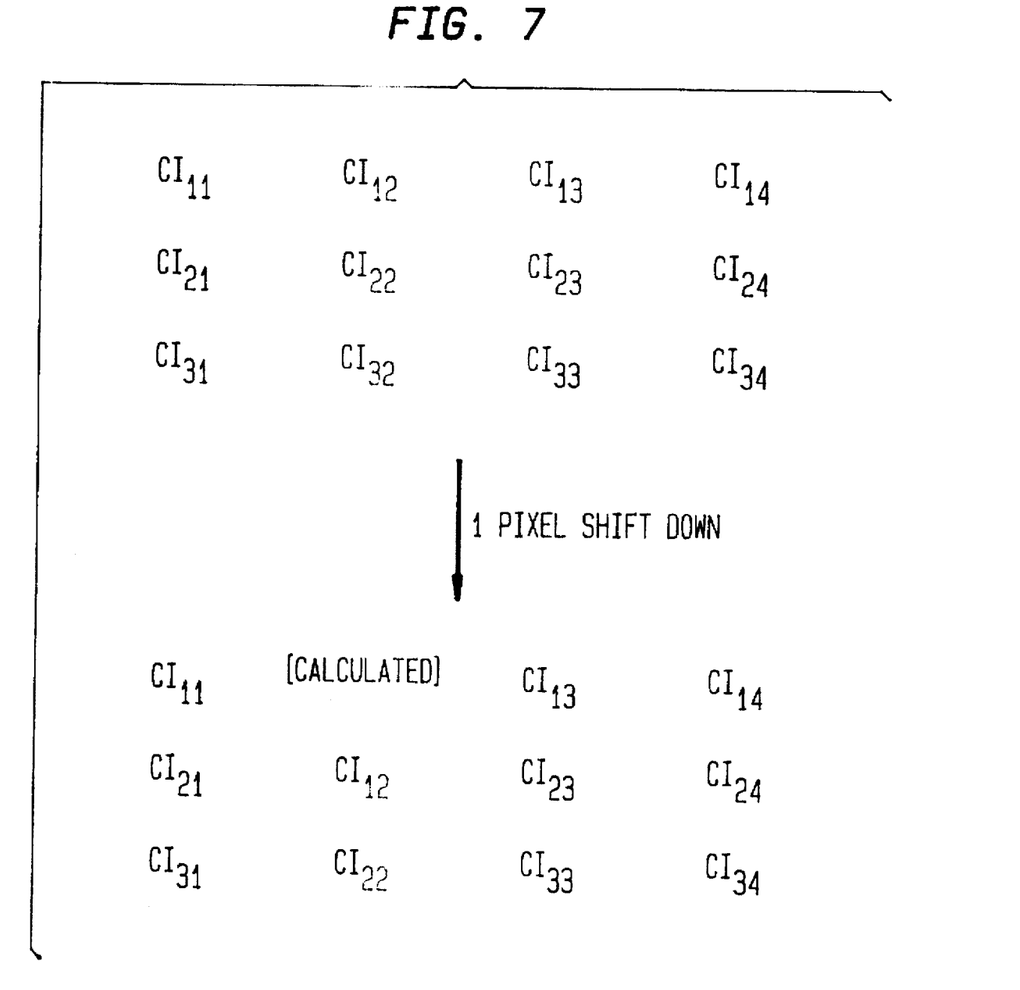
FIG. 7 schematically illustrates a data shift within an X-direction second derivitive image, which data shift corresponds to one pixel of motion to the left.

After the row and column images have been constructed, they are used to construct two second derivitive images (FIGS. 4 and 5). From the column image (FIG. 2), the second derivitive ("X-direction second derivitive") is calculated individually along each row to create the X-direction second derivitive image shown in FIG. 4. This X-direction second derivitive image contains twelve data elements XD1,1, XD1,2 ... XD3,4, each data element being a second derivitive taken along the X direction between two adjacent pixels shown in FIG. 2. Analogously, the same calculations are performed on data in the row image (FIG. 3), producing the Y-direction second derivitive image shown in FIG. 5. This Y-direction second derivitive image contains twelve data elements YD1,1, YD1,2, ... YD4,3 each being the second derivitive ("Y-direction second derivitive") taken along the Y direction between two adjacent pixels shown in FIG. 3.

To compute the X-direction second derivitive image in accordance with the preferred embodiment, the following formula is used $$XD_{i,j}=[CI_{i,j+1}-CI_{i,j}]-[CI_{i,j}-CI_{i,j-1}]$$

and the following boundary conditions are applied $XD_{i,0}$ (the elements in the leftmost column)=0 and $XD_{i,4}$ (the elements in the rightmost column) $=CI_{i,4}-CI_{i,3}$ for all i By way of a 5×5 example, if the column image data were to be

| 2 | 2 | 3 | 1 | 1 |
| 3 | 3 | 90 | 4 | 4 |
| 90 | 90 | 80 | 87 | 80 |
| 80 | 80 | 4 | 82 | 79 |
| 4 | 4 | 4 | 5 | 3 | the X-direction first derivitive image would be

| 0 | 0 | 1 | −2 | 0 |
| 0 | 0 | 87 | −86 | 0 |
| 0 | 0 | −10 | 7 | −7 |
| 0 | 0 | −76 | 78 | −3 |
| 0 | 0 | 0 | 1 | −2 | and the X-direction second derivitive image would be

| 0 | 1 | −3 | 2 | 0 |
|---|---|---|---|---|
| 0 | 87 | −173 | 86 | 0 |
| 0 | −10 | 17 | −14 | −7 |
| 0 | −76 | 154 | −81 | −3 |
| 0 | 0 | 1 | −3 | −2 |

The Y-direction second derivitive image is computed similarly.

As in the mapping process, these calculations can be performed simultaneously or in any order; the order of calculation is not part of the invention. Furthermore, this 5×5 example relates to a discrete image, i.e. an image in which all the pixel values are integers. If sub-pixel level motion correction is required, surface fitting and interpolation can be used. Persons skilled in the art of image processing are familiar with such computations.

In accordance with the preferred embodiment of the invention, the next step is to calculate, for each SPECT projection image frame, and from the data elements in the X- and Y-direction second derivitive images, a characteristic X-direction function and a characteristic Y-direction function. In accordance with the preferred embodiment, for frame A, the characteristic X-direction function ACX is determined by adding the magnitudes (absolute values) of the data elements in the first column of the X-direction second derivitive image, i.e. $ACX = XD1,1 + XD2,1 + XD3,1$. Similarly, for frame A, the characteristic Y-direction function ACY is determined by adding the magnitudes of the data elements in the first row of the Y-direction second derivitive image, i.e. $ACY = YD1,1 + YD1,2 + YD1,3$. Analogously, for frame B, the characteristic X-direction function $BCX = XD1,2 + XD2,2 + XD3,2$ and the characteristic Y-direction function $BCY = YD2,1 + YD2,2 + YD2,3$. CCX, CCY, DCX and DCY are similarly calculated for frames C and D.

In the above 5×5 illustration, the characteristic X-direction function would be

| 0 | 173 | 348 | 186 | 12 |
|---|---|---|---|---| because the magnitudes (absolute values) of the values are considered; the signs are ignored.

In still further accordance with the preferred embodiment, the next step is the calculation of the mean characteristic X-direction function and the mean characteristic Y-direction function. In the original oversimplified 4×4 example, the mean characteristic X-direction function CX equals (ACX+BCX+CCX+DCX)/4, and the mean characteristic Y-direction function CY equals (ACY+BCY+CCY+DCY)/4 because there are four frames of planar SPECT projection image data, but in general the mean characteristic X- and Y-direction functions are significant only if there are a large number (e.g. 32 or more) of frames.

In instances where the characteristic X-direction function for a particular frame (e.g. ACX, BCX, CCX, DCX) is significantly greater than the mean characteristic X-direction function CX (in the preferred embodiment, ACX is "significantly greater" when ACX>1.5 * CX and ACY is similarly "significantly greater" when ACY>1.5 * CY, but the 1.5 multiplier factor is not a part of the invention and another factor can be used instead), this indicates that the frame in questions contains significant motion in its SPECT projection image data data. For example, if ACX satisfies the above relationship, the SPECT projection image data in frame A contain significant motion in the Y direction. Likewise, if ACY satisfies the above relationship, the SPECT projection image data in frame A contain significant motion in the X direction.

In accordance with the preferred embodiment of the invention, once it is known that the SPECT projection image data in a particular frame contains significant motion, this motion is quantified. (Quantification is carried out in the X and Y directions, since all motion can be decomposed into a combination of motion in the X direction and motion in the Y direction.) In general, quantification is carried out by shifting data within the original row or column image (see FIGS. 6 and 7, which illustrate positive and negative one pixel X-direction motion correction in the second column), recalculating the X- and Y-direction second derivitive images and the characteristic X- and Y-direction functions based upon the shifted data, and identifying the data shifts that minimize these functions.

The methodology of this quantification process, as implemented in the preferred embodiment, will be illustrated for a particular instance. Let it be assumed that frame B is identified as containing significant motion in the Y direction alone. Let it also be assumed that this motion is either one pixel up or down. Because the motion has been localized to frame B, the effects of this motion will appear exclusively in the second column of the column image (CI1,2, CI2,2, CI3,2 in FIG. 2). Because only Y-direction motion (i.e. up and down motion) exists, it is only necessary to quantify the motion in one direction, namely the Y direction.

Figure 8:
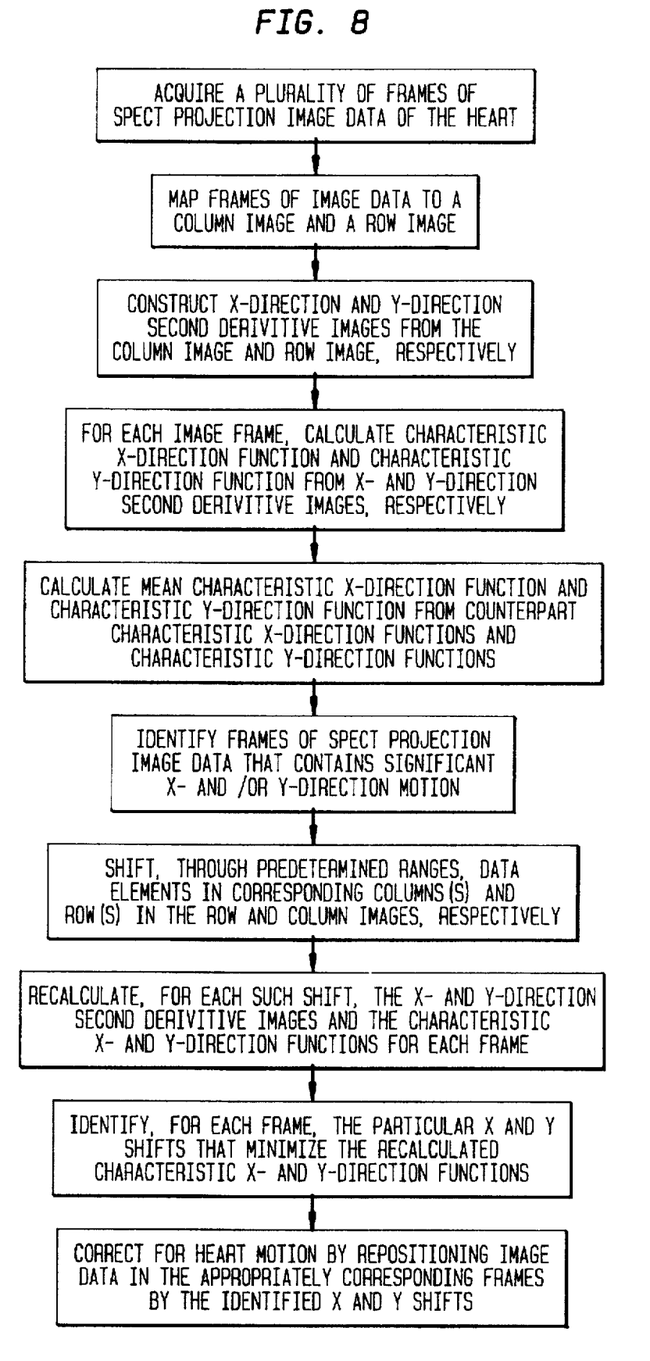
FIG. 8 is a flowchart of a preferred embodiment of the invention.
Figure 9:
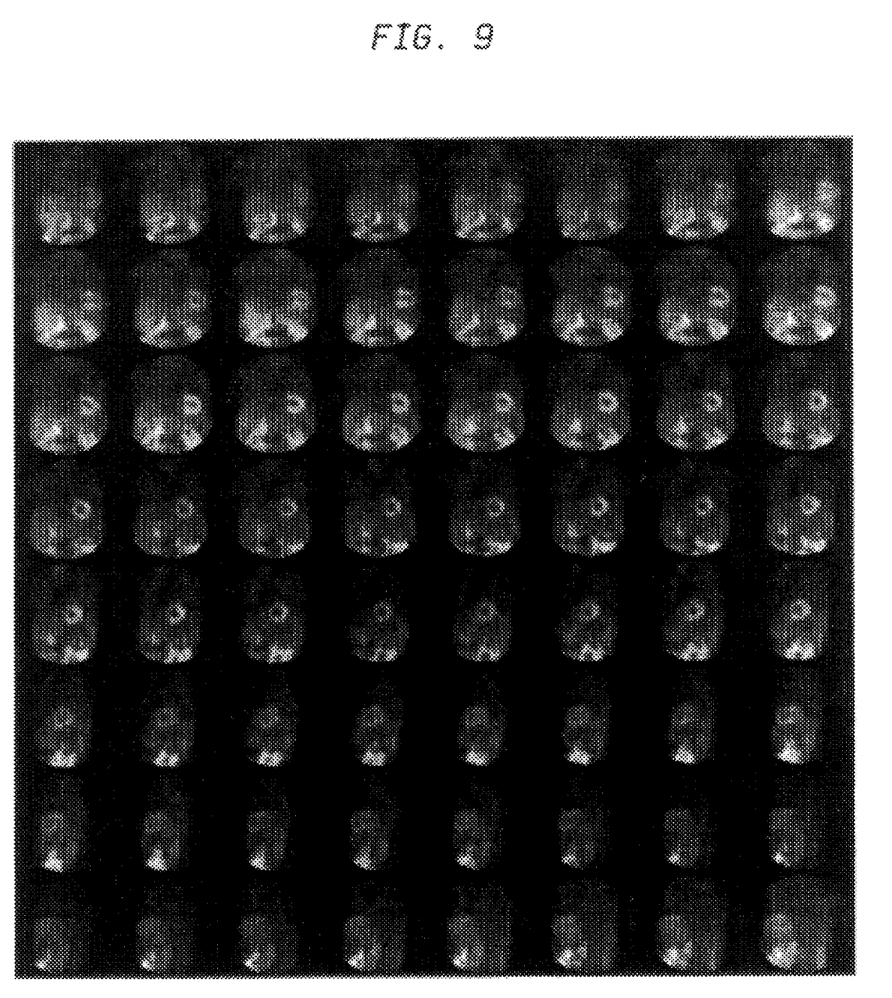
FIG. 9 shows 64 frames of planar SPECT projection image data, each 64 pixels square.
Figure 10:
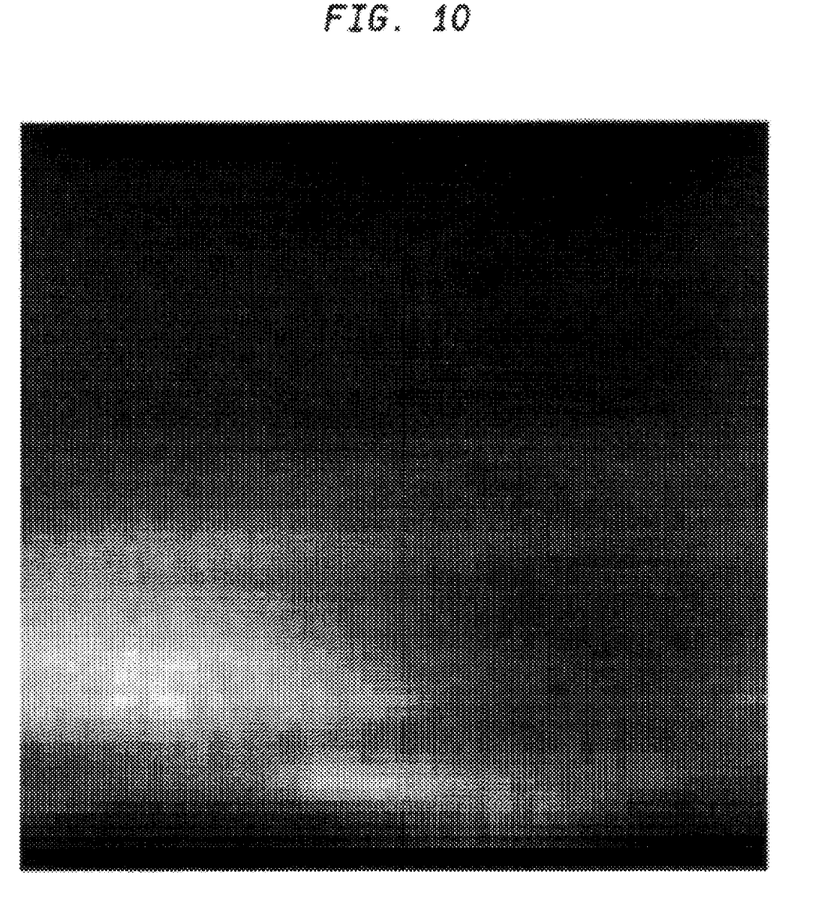
FIG. 10 shows a column image constructed from the FIG. 9 image data in accordance with the preferred embodiment of the invention.
Figure 11:
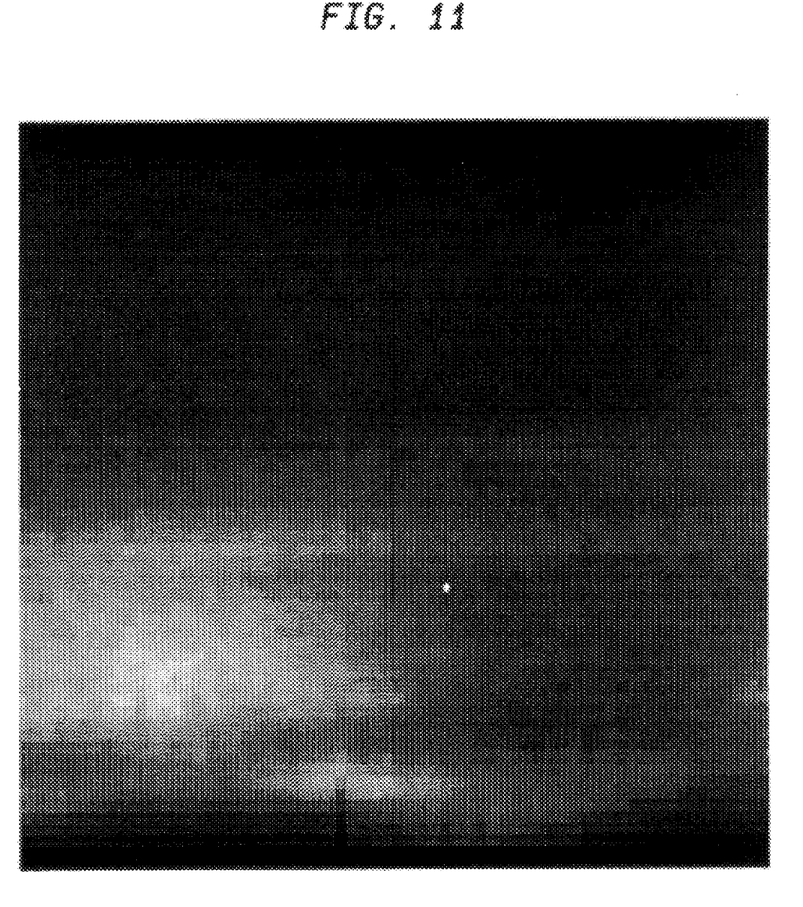
FIG. 11 shows the column image of FIG. 10, but with motion in the 27th frame of planar SPECT projection image data.
Figure 12:
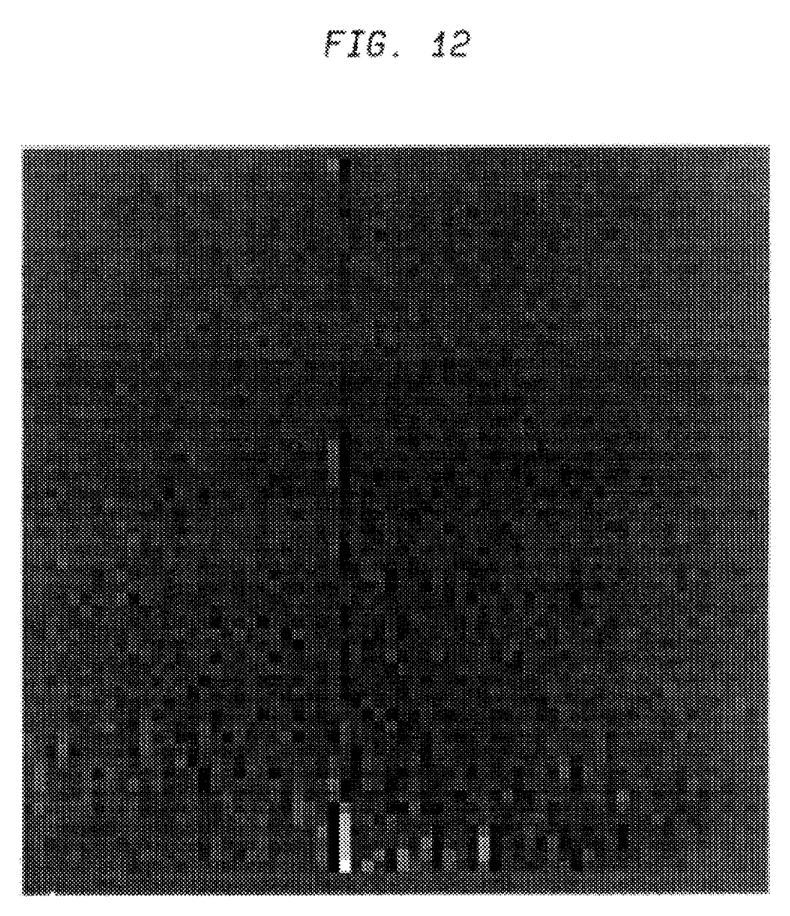
FIG. 12 shows a first derivitive image constructed from the FIG. 11 image.
Figure 13:
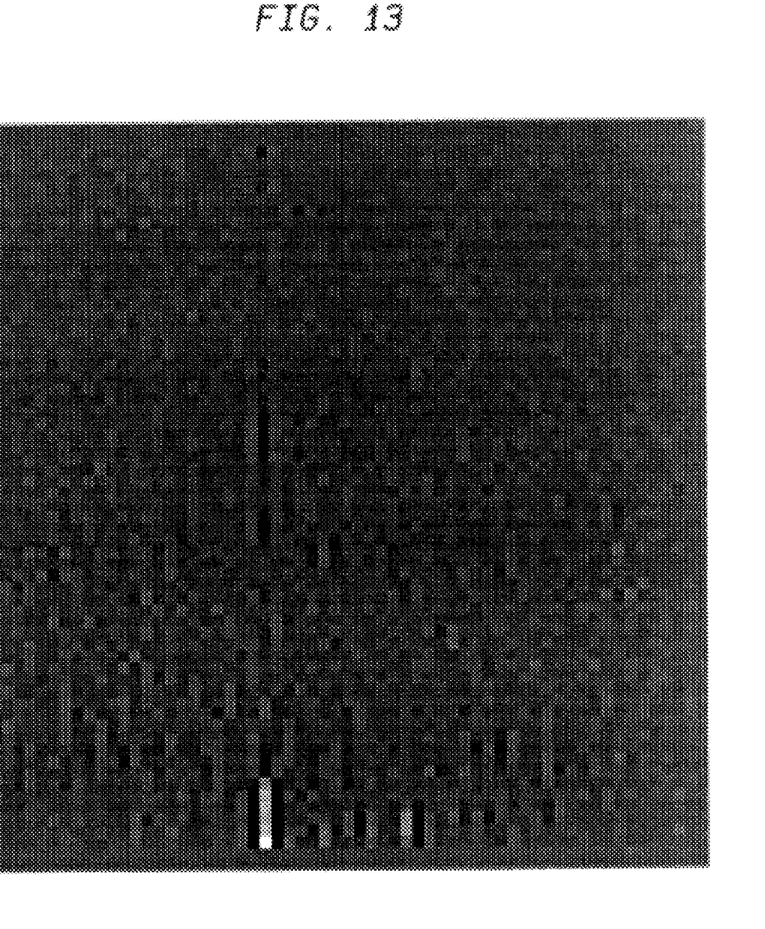
FIG. 13 shows a second derivitive image constructed from the FIG. 12 image.
Figure 14A:
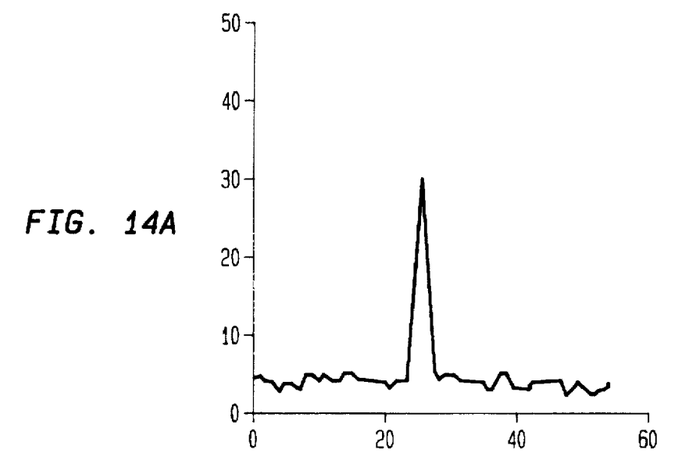
FIGS. 14A–14F illustrates variation of the characteristic function with pixel shifts along the Y direction.
Figure 14B:
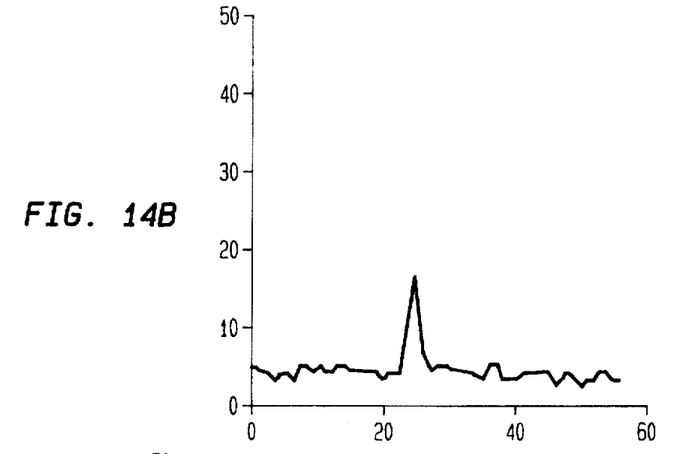
Figure 14C:
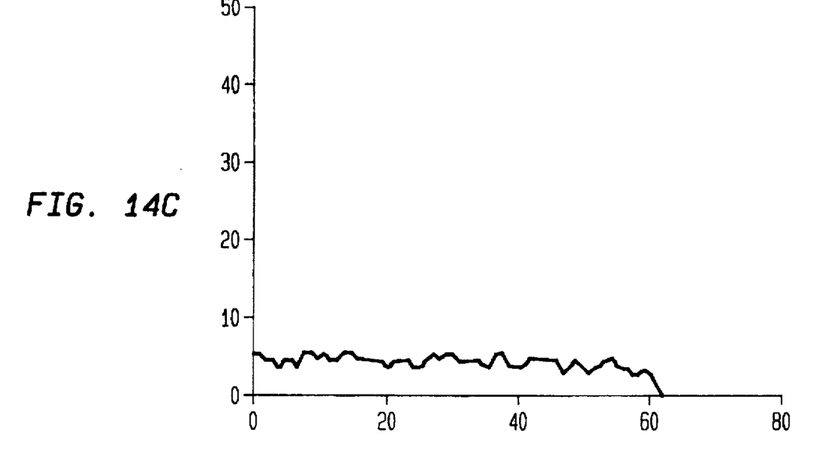
Figure 14D:
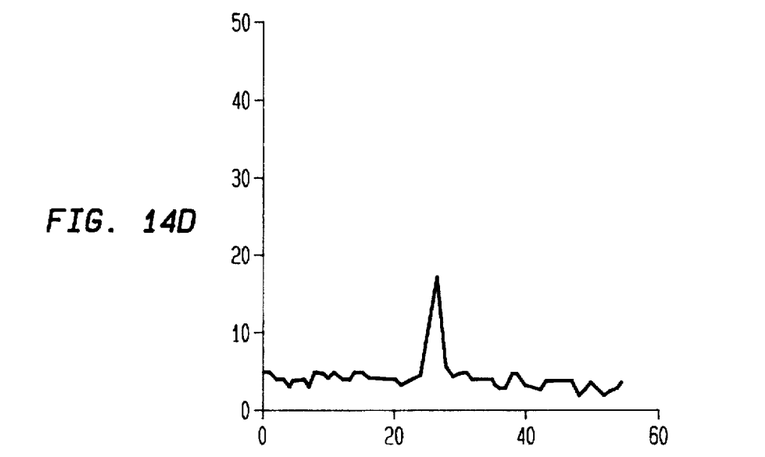
Figure 14E:
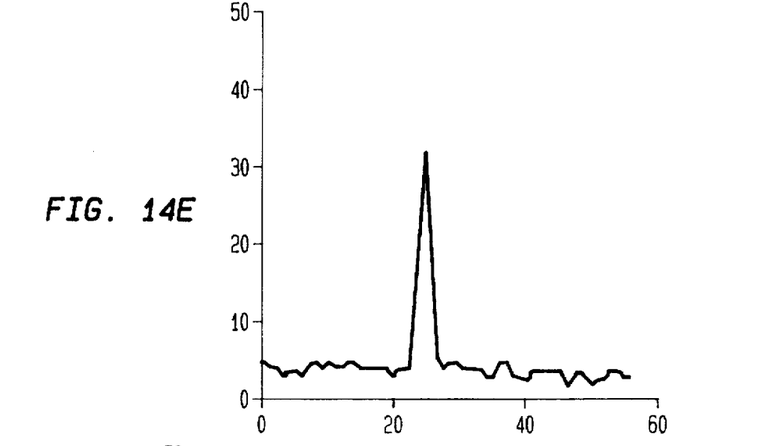
Figure 14F:
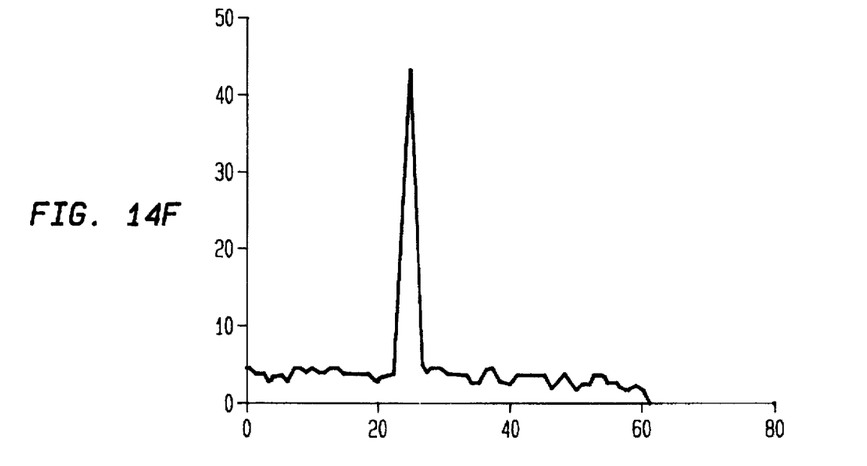
Figure 15:
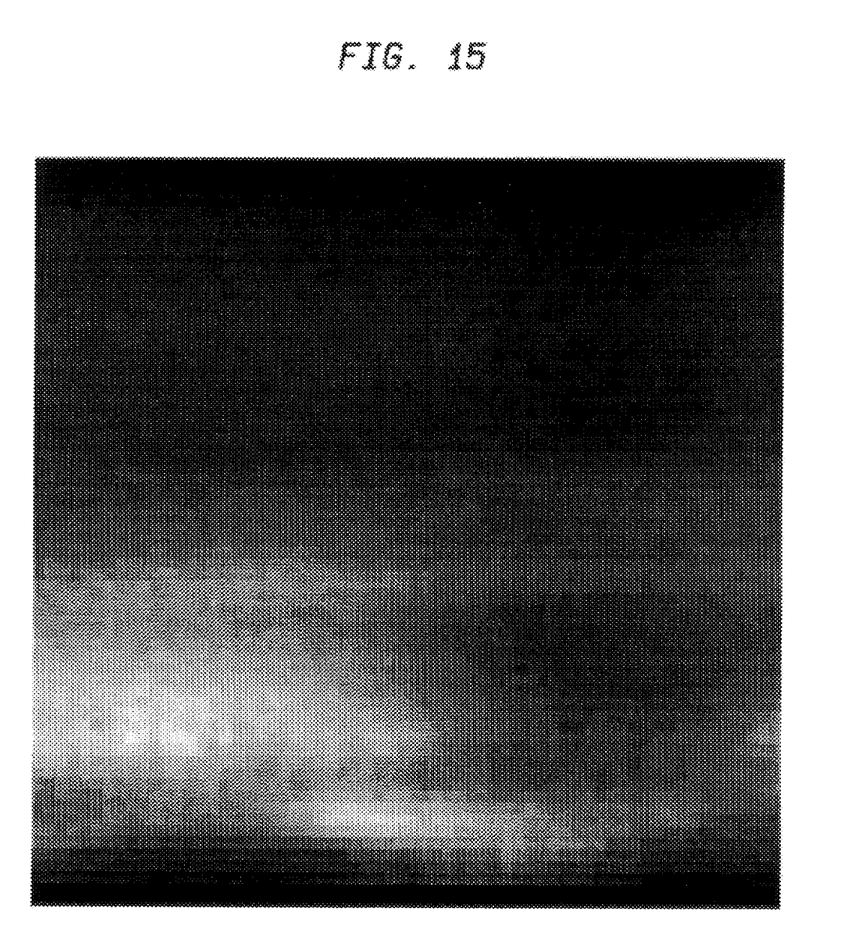
FIG. 15 illustrates the column image of FIG. 11, corrected for the motion in the 27th frame.

FIG. 8 is a flowchart of the preferred embodiment of the invention. Initially, a plurality of frames of SPECT projection image data are acquired. For a 180° cardiac study, there will typically be 64 image frames, each measuring 64×64 pixels.

Then, these frames are mapped to a row image and a column image. Typically, the row image will have 64 rows and 64 columns in which each row corresponds to one image frame of the original SPECT projection data, and the column image will have 64 columns and 64 rows in which each column corresponds to one image frame of the original SPECT projection data.

Next, the row and column images are used to generate X- and Y-direction second derivitive images. The X-direction second derivitive image will typically have 64 rows and 64 columns, and the Y-direction second derivitive image will typically have 64 rows and 64 columns.

Thereafter, for each of the 64 frames of data, a characteristic X-direction function and a characteristic Y-direction function is calculated. The result of this calculation step is typically 64 characteristic X-direction functions and 64 characteristic Y-direction functions. From these can then be calculated the mean characteristic X-direction function and the mean characteristic Y-direction function.

The next step is an identification of each frame of SPECT projection data in which significant motion is contained. In the preferred embodiment, this identification is carried out by identifying those frames that a characteristic X-direction function or a characteristic Y-direction function that exceeds e.g. the product of 1.5 times the mean characteristic X-direction function or the mean characteristic Y-direction function respectively.

Since the motion-containing frames of SPECT projection data have now been identified, the next step is to quantify the motion in each frame. Let it for example be assumed that the 37th frame is determined to contain both X and Y motion and that by assumption this motion is considered to be no greater than 5 pixels in either direction.

Under these assumptions, and taking Y-direction motion first, data in the 37th column of the column image is shifted down 5 pixels, with calculated values being supplied as required. Then, the characteristic X-direction function for frame 37 is computed.

Next, data in the 37th column of the column image is shifted once again, to produce a net displacement of 4 pixels down from their original position (calculated values being supplied as required). The X-direction second derivitive and the characteristic function for frame 37 are computed once again.

This process is then repeated for net displacements of 3, 2, 1 and 0 pixels down from the original data position and then 1, 2, 3, 4 and 5 pixels up from the original data position. At the end, whichever one of the eleven thus-computed characteristic functions is the smallest will determine the correction needed for the Y-direction motion in the 37th frame.

This process is then carried out to quantify the X-direction motion for the 37th frame, and repeated as necessary to quantify the X- and Y-direction motions in each of the image frames determined to contain significant motion.

Once this quantification process has been carried out, it is known that e.g. the 37th frame contains +3 pixels of X-direction motion and −2 pixels of Y-direction motion. It is then possible to reposition the image data in the 37th frame by moving it 3 pixels to the left and two pixels up, thereby correcting for the motion in the 37th frame. The same correction process can then be carried out for each frame in which significant motion exists. Once such correction has been carried out, the corrected (i.e. appropriately repositioned) image data can be used (as by backprojection) to reconstruct a three-dimensional image of the heart.

Simulations using actual SPECT projection images of the human heart have shown this preferred embodiment to be robust. Even a one-pixel shift in a 64×64 pixel image can be computer-detected and computer-corrected. FIGS. 9 to 15 illustrate this.

In most cases, more than one SPECT projection image frame will contain motion data. In accordance with the preferred embodiment, the process of detecting and correcting for patient motion is carried out from left to right in the column image. Hence, if motion is detected in the 3rd, 4th, 17th and 18th image frames, the 3rd column of the column image is corrected first. Then, the 4th column of the column image is corrected, followed in order by correction of the 17th and 18th columns. Similarly, motion correction occurs from top to bottom in the row image.

Although a preferred embodiment has been described above, the scope of the invention is limited only by the following claims:

I claim:

1. A method of detecting overall movement of a patient's body organ relative to a detector of a scintillation camera, comprising the following steps:

conducting a SPECT study of the body organ and thereby acquiring a plurality of frames of SPECT projection image data;

mapping each of said frames to a single one-pixel-wide column of image information, thereby creating a column image made up of one-pixel-wide columns of image data each containing a plurality of pixels of varying intensity;

mapping each of said frames to a single one-pixel-wide row of image information, thereby creating a row image made up of one-pixel-wide rows of image data each containing a plurality of pixels of varying intensity;

constructing an X-direction second derivitive image from the column image and a Y-direction second derivitive image from the row image;

calculating, for each frame, a characteristic X-direction function from the X-direction second derivitive image and a characteristic Y-direction function from the Y-direction second derivitive image; and identifying frames in which at least one of said characteristic X-direction function and said characteristic Y-direction function has a value indicating that the image data in the frame contains significant motion.

2. The method of claim 2, wherein said identifying step comprises the steps of computing a mean characteristic X-direction function and a mean characteristic Y-direction function, and comparing, on a frame by frame basis, the characteristic X-direction function and the characteristic Y-direction function with the mean characteristic X-direction function and the mean characteristic Y-direction function respectively.

3. The method of claim 2, further comprising the step of quantifying motion in each of the identified frames.

4. The method of claim 3, wherein said quantifying step comprises the steps of shifting data items within the column and row images, recalculating said X- and Y- direction second derivitive images and said characteristic X- and Y-direction functions, and identifying which shifts minimize said recalculated characteristic X- and Y-direction functions.

5. The method of claim 3, further comprising the steps of correcting the image data in said identified frames and reconstructing an image of said body organ based upon said corrected image data.

6. The method of claim 1, wherein the body organ is the heart.

7. The method of claim 1, wherein all steps are carried out by a computer.

* * * * *